April 5, 1927.
E. HERDS
MOTOR VEHICLE
Filed March 1, 1923  3 Sheets-Sheet 1
1,623,726
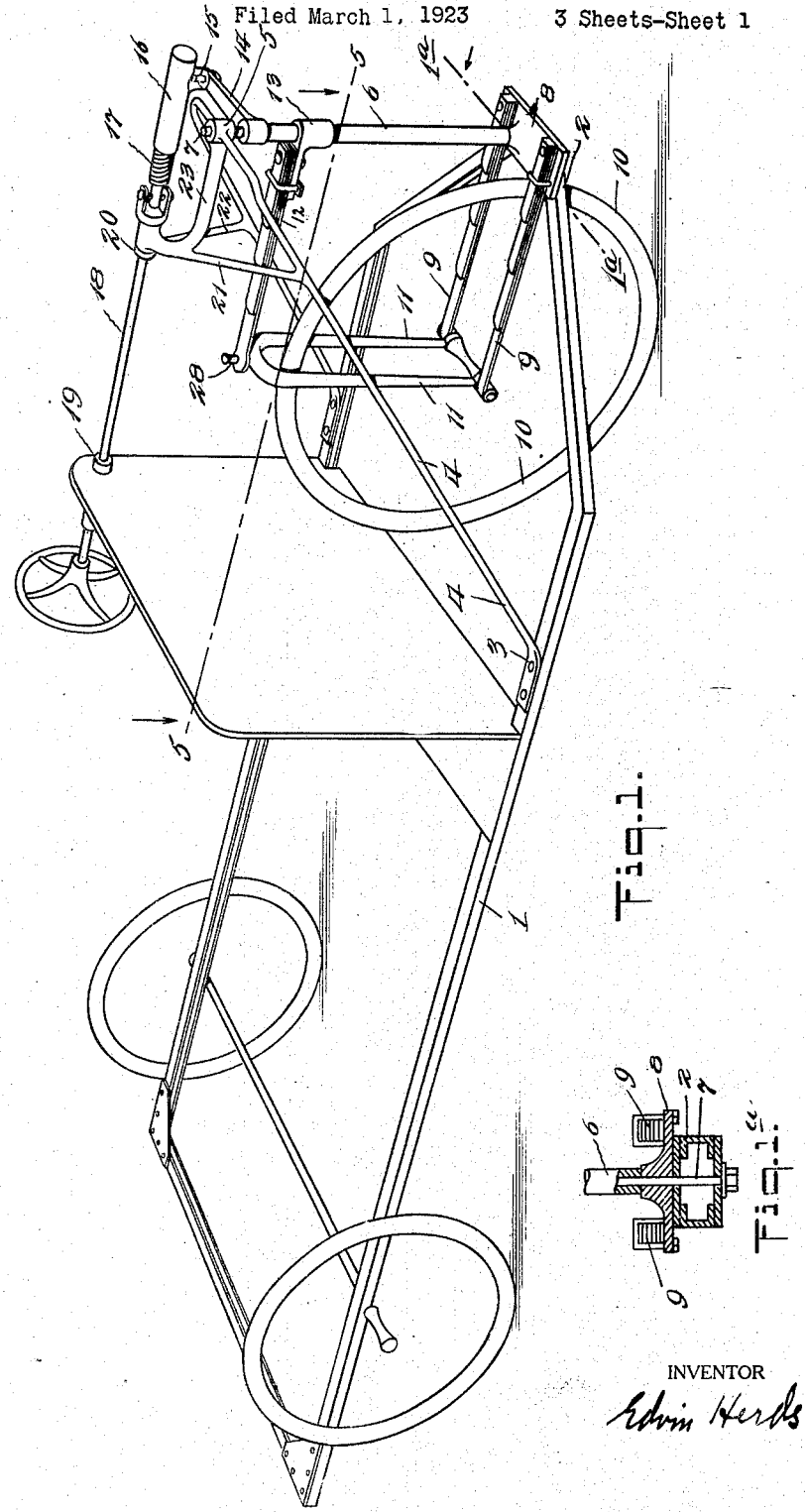
INVENTOR
Edwin Herds

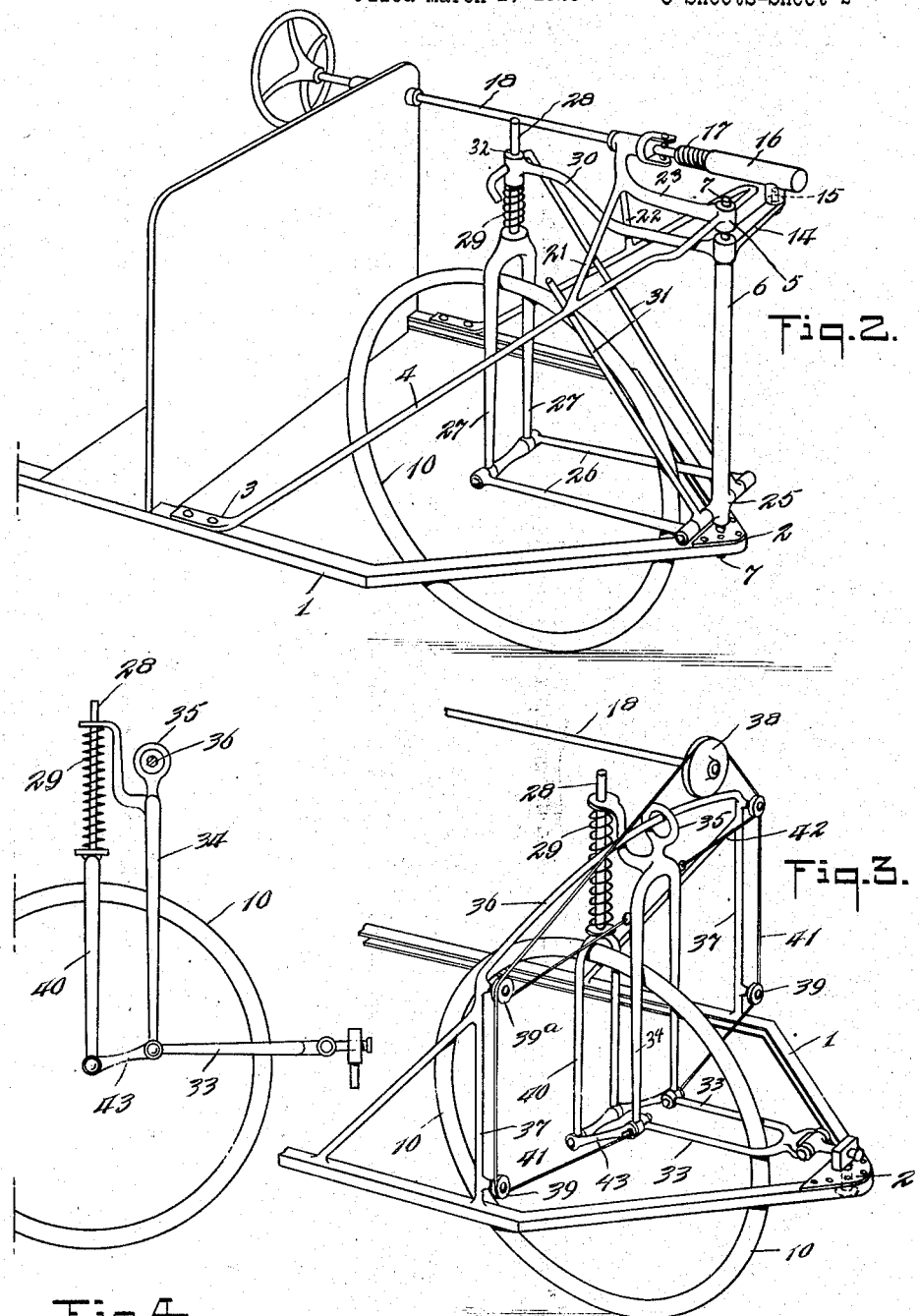

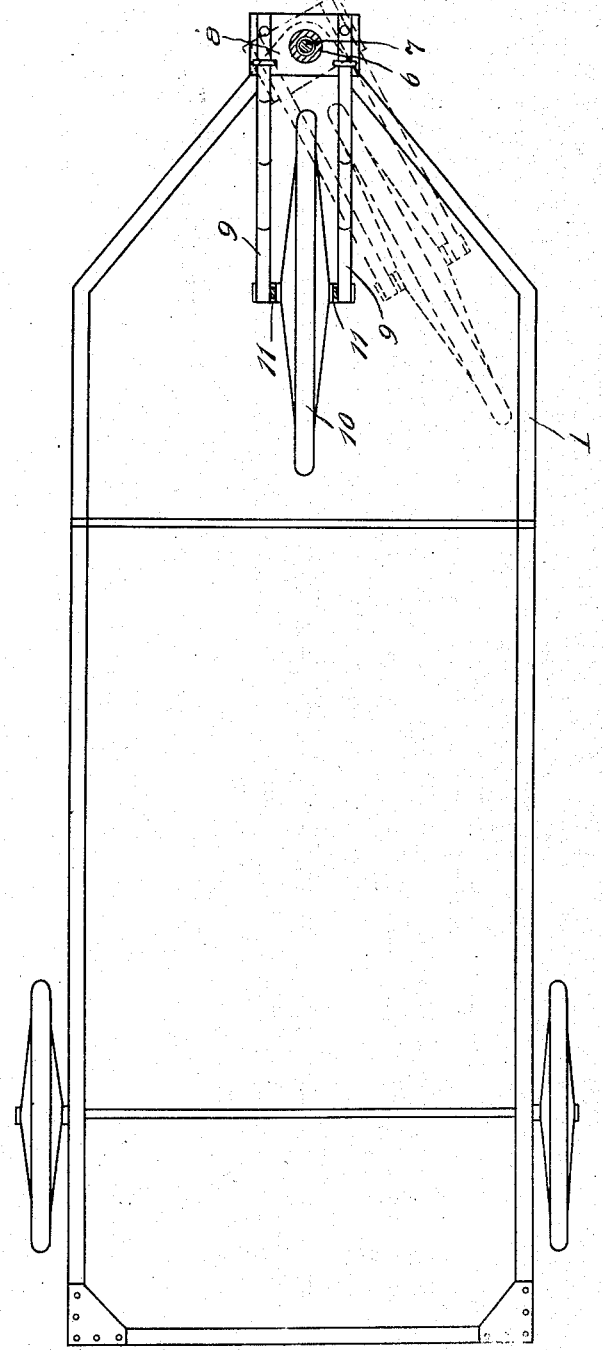

Patented Apr. 5, 1927.

1,623,726

UNITED STATES PATENT OFFICE.

EDVIN HERDS, OF NEW YORK, N. Y.

MOTOR VEHICLE.

Application filed March 1, 1923. Serial No. 622,123.

This invention relates to three-wheel vehicles of the kind of which the single wheel is arranged at the front of the vehicle behind a vertical axis about which it can be deflected for steering purposes, and its object is mainly to provide means whereby this wheel arrangement can be advantageously utilized in fast moving vehicles.

With this object in view the invention consists essentially in mounting the steering wheel on the free ends of rearward extending, resilient or jointed members and providing means for equalizing the flexure of these members. The front ends of said members being fastened at about the level of wheel axle to a vertically inclined pivot member, or otherwise connected to the front of the vehicle in front of the wheel. This arrangement greatly reduces the strain on the pivoted member allowing lighter construction of the parts and giving greater flexibility, thus making it possible to drive the vehicle at greater speed.

Other novel features of the invention will be described in the following description and drawings.

It is to be understood that the term "vehicle" as used hereinafter is applicable to any kind of vehicle using a single wheel in front thereof; be it motorcycle, cycle car, truck, tractor or steam roller.

Figure 1 is a general perspective side and front view of the chassis. Figure 1ª is an enlarged vertical section of the lower front part of the chassis and of pivot member on line 1ª—1ª of Figure 1. Figure 2 is a part perspective front and side view showing a variation of construction from that in Figure 1.

Figure 3 is similar perspective with a still further variation of construction.

Figure 4 is a partial plan elevation of same construction as Figure 3.

Figure 5 is a horizontal sectional view of the chassis as seen down on line 5—5 of Figure 1.

Referring first to Figure 1 we have a general view of the chassis, whose rear end may have any conventional and convenient con50 struction. The side members 1, 1 of the main frame are bent inward at their forward ends and joined together at the front as at 2. At any place further back, as at 3, secondary frame members 4 are fastened to the main frame members 1, 1, thereafter rising, extending forward and converging together, finally joining directly above or somewhat back of a perpendicular from the joining point of the main frame members.

Rotatably mounted between the main and secondary frame members is a pivot element, axis or pivot member 6 in a vertical or rearward inclined position. This pivot member is of a hollow tubular cross section allowing an axis, shaft or rod 7 to pass through same so that, if the ends of said shaft 7 are fastened to the main frame at 2 and to the secondary frame at 5, the pivot member 6 will be free to rotate thereon.

Nearer to the lower part of pivot member 6 there is a casting 8 to provide a seat or perch for the fastening of two laminated springs 9, one to each side of said pivot member or axis by clips and bolts in such way as to be rigidly held to it. Extending rearward toward the back of the chassis the other ends of said springs are then fastened in any convenient manner to the ends of the axle of wheel 10, as, for example, by passing the axle ends of said wheel through the spring eyes.

It will be seen that these two springs 9, 9 form in effect a fork, whose crown end is rigidly fastened to the pivot member 6. Turning said pivot member will now force the wheel 10 to either side of the chassis and thereby displace the centre of weight of the vehicle towards the centre of the circle in which the vehicle may be moving, thus producing a stabilizing effect. The dotted lines in Figure 5 will show such displacement.

It is also desirable to equalize the amount that each said spring 9 may yield when the vehicle strikes against obstructions on the road. I have therefore another fork-like member 11 of light construction fastened to the springs 9, 9 thence rising upwardly toward the upper part of pivot member 6, and from the upper part of pivot member 6 I have another vertically yielding member in a general form of a link, fork or spring, as 12, connected flexibly to the crown end of said fork 11, so that same is able to move in relation as the springs 9, 9 yield but keeps the tension even on both said springs. The vertically yielding member used in the illustration is a laminated spring 12 fastened to a casting 13 on the upper end of pivot member 6 thence extending rearward, as already mentioned, to the upper part or crown of forklike member 11 to which it is flexibly fastened.

It will now be apparent that while the wheel 10 may yield against the springs vertically when receiving an impact, it can not swerve laterally except by turning the pivot member 6 which however is under the control of a steering device.

To provide a simple and effective steering means I have a crank member 14 securely fastened to the upper part of pivot member 6 or made an integral part thereof. Journaled on crank pin 15 is a screw case 16 within which is a large nut into which a screw 17 can turn. Steering shaft 18 extending forward through dash board bearing 19 in substantially horizontal plane, or a plane in right angles to pivot member, has a collar 20 fastened on its forward end. The collar is journaled to supporting members 21, 22 and 23 as illustrated. These supporting members are securely fastened to secondary frame members 4, 4. The flanges on the collar 20 prevent same from slipping back and forth on said supporting members. The rear end of screw 17 is universally joined to said collar 20, the other end being partly within a nut in screw case 16, whence it will be seen that turning the steering shaft 18 will cause the distance between supporting member 21 and crank pin 15 to shorten or lengthen, according to the turning of shaft 18, and thus cause the turning of pivot member 6 thereby effecting the steering of the vehicle.

Referring now to Figure 2, I have a cross member 25 fastened to, or made an integral part of, the lower part of pivot member 6, in the place of casting 8 in Figure 1. Pivotally connected to the ends of said cross member 25, I have a fork-shaped member 26, which consists essentially of two link-like members. The rear ends of these link-like members extend rearward to be connected in any convenient manner to the axle of wheel 10.

Another fork-like member 27 fastened in any convenient way to said fork 26 or to the wheel axle, rises perpendicularly towards the upper end of pivot member 6, as in the illustration, and carries on its upper end 28 a coiled spring 29, which is intended to absorb the road shocks.

The said spring 29 is held in tension by stay member 30, which is reinforced by secondary stay members 31, 31 and together held securely to pivot member as illustrated.

The head 28 of fork 27 can oscillate through an opening 32 on stay member 30 accordingly as spring tension varies. It will be seen that since fork-like member 26 yields only vertically in relation to pivoted member 6, the steering of this combination can be effected the same as in the first instance.

Turning now to Figures 3 and 4, the same principle of pivoting a wheel fork to the front of a vehicle chassis is seen, applied in a still different way, which may be more suitable to heavy and slow moving vehicles, such as tractors etc.

Here a substantially horizontally disposed fork member 33 is universally connected to the very front of the chassis. Extending rearward the prongs are respectively flexibly joined to a substantially vertically disposed fork-like member 34 whose crown end has a loop 35 large enough to have a little universal and turning movement on a cross member 36. The cross member 36 is secured rigidly to the lower frame members 1 by upright posts 37, 37.

In this case, the steering shaft 18 has its forward end journaled either to a frame cross member 36 and carries on its forward end a sprocket wheel 38. Smaller free pulleys 39 and 39$^a$ secured to the other side, and to the lower ends of post 37 allow the sprocket chain, or cord, 41 to pass from wheel 38 to the lower ends of fork 34. Similarly another chain, or cord, 42 can pass from wheel 38 and round 39$^a$, the ends of this cord, or chain, 42 can be fastened to the crown end of fork 34. Turning the steering shaft 18 would now cause the fork combination to move to either side of the chassis supported by the frame cross member 36 and sliding thereon.

The holding of wheel fork 40 by link members 43 to fork 34 and its spring arrangement is similar to commonly known motorcycle fork arrangement in reverse order and, therefore, needs no further explanation here.

While the foregoing fully explains the main principles of my invention, I wish to point out that same are merely illustrative as preferred embodiment of my invention. Variation of construction and mechanical refinements can be made therein by any one conversant with the art of vehicle engineering, without however departing from the main idea of my invention, therefore, I do not care to confine my invention to the precise construction and arrangement of parts other than that defined by the appended claims.

What I claim is:—

1. In a vehicle having a single front wheel, in combination, a flexible substantially horizontally disposed fork-like member securely fastened by its crown to the front of the vehicle and thence extending rearwardly to a wheel axle, a wheel axle, equalizing elements connected to said forklike member and a steering device adapted to swing said fork-like member laterally for steering and stabilizing purposes.

2. In a vehicle having a single front wheel, in combination, a front wheel, an upright post of the vehicle frame directly in front of said wheel, an axle to said wheel, a vertically yieldable member connecting each side of the wheel axle to the upright post, a member connecting each vertically yieldable member to an overhanging spring suspension member, an overhanging spring suspension member and a steering device connected with said upright post and capable of turning the same.

3. In a vehicle having a single front wheel, in combination, a flexible substantially horizontally disposed fork-like member securely fastened by its crown to the front of the vehicle and thence extending rearwardly to a wheel axle, a wheel axle, equalizng elements disposed at an angle to said fork-like member and connecting with a superimposed spring member, a superimposed spring member and steering means adapted to shift said wheel laterally for steering and stabilizing purposes.

4. In a vehicle having a single front wheel, in combination, a substantially vertically disposed pivot member, laminated spring members in an approximate form of a fork fastened rigidly to said pivot member whereby a front wheel will be maintained behind said pivot member in vertically yielding position, a front wheel, additional means for equalizing the tension of said springs and a device for steering said front wheel through the medium of said pivot member and said spring.

5. In a vehicle of the kind described, a substantially horizontally disposed fork-like member pivoted yieldingly and vertically from a substantially vertically disposed pivot member on front of the vehicle and in front of the wheel, a substantially vertically disposed pivot member on front of the vehicle and in front of the wheel, a stay member rigidly fastened to said pivot member, a spring member between said pivoted fork-like member and said stay member, and a steering means to turn said pivot member and shift said wheel.

In testimony whereof I affix my signature.

EDVIN HERDS.